United States Patent Office 2,776,264
Patented Jan. 1, 1957

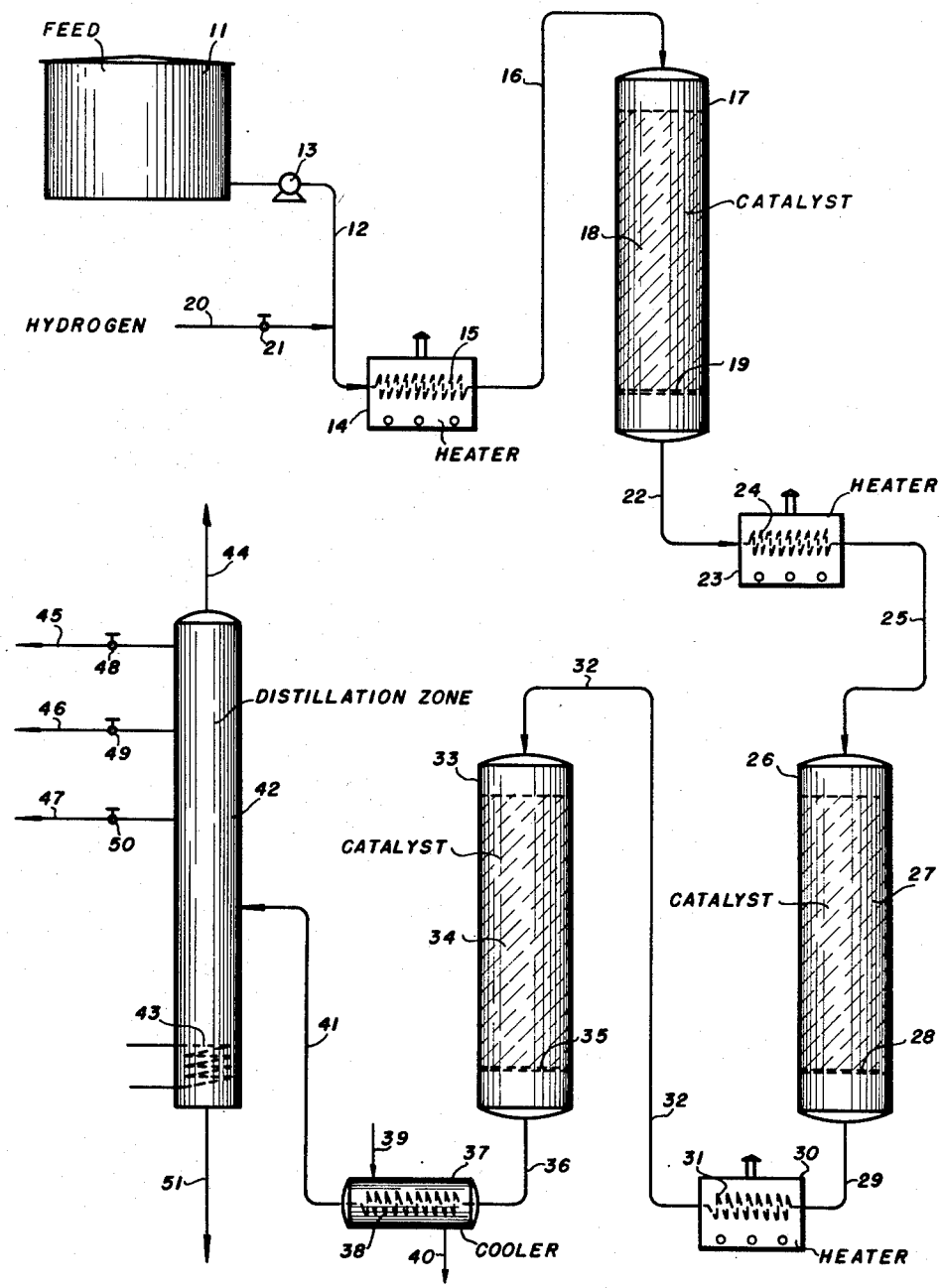

2,776,264

PREPARATION OF PLATINUM-ON-ALUMINA CATALYST COMPOSITE

James A. Dinwiddie and Max A. Mosesman, Baytown, Tex., assignors, by mesne assignments, to Esso Research and Engineering Company, Elizabeth, N. J., a corporation of Delaware Application March 6, 1953, Serial No. 340,892

4 Claims. (Cl. 252—466)

The present invention is directed to a method of preparing an improved catalyst and a method of using same. More particularly the invention is directed to a method for preparing a platinum on alumina catalyst and the use thereof in converting hydrocarbons.

This application is a continuation-in-part of Serial No. 318,213, filed November 1, 1952, for James A. Dinwiddie and Max A. Mosesman and entitled "Preparation of Improved Alumina."

The present invention may be described briefly as involving the preparation of a platinum on alumina catalyst by admixing a platinum containing compound with gamma alumina derived from boehmite and then heating the admixture to a sufficient temperature to remove any water associated with the platinum-containing compound or gamma alumina to form a platinum on gamma alumina catalyst. The heating operation may also serve to decompose the platinum compound when it is susceptible to thermal decomposition.

The invention includes the method of employing the catalyst to convert hydrocarbons in which a hydrocarbon boiling in the range from about 100° to about 500° F. is contacted with the catalyst at a temperature in the range from about 850° F. to about 1000° F. in the presence of hydrogen at a pressure in the range from about 200 to about 750 p. s. i. g. The feed is contacted with the catalyst at a space velocity in the range from about 1 to about 5 volumes of feed per volume of catalyst per hour, preferably 2 to 3 volumes of feed per volume of catalyst per hour.

The catalyst prepared in accordance with the present invention is prepared on a gamma alumina which is derived from alumina alpha monohydrate which has been given the name of boehmite. The boehmite used in preparing the gamma alumina is formed from an aluminum alcoholate by contacting the aluminum alcoholate with controlled amounts of moisture. Thus in accordance with the present invention, aluminum alcoholate may be formed by reacting aluminum metal such as aluminum turnings with an aliphatic alcohol such as one having from 1 to 10 carbon atoms in a molecule. The aluminum metal reacts with the alcohol, for example, methyl, ethyl, propyl, butyl, amyl, hexyl, heptyl and octyl alcohols and the like at a temperature in the range from about 75° to about 300° F. Thereafter the aluminum alcoholate may be contacted with atmospheric moisture at atmospheric temperatures or it may be contacted with steam at the boiling point of water or at a temperature above the boiling point of water, or it may be contacted with water at a temperature no less than the temperature at which water boils. Thus the boiling point of water may be less above sea level than it is at sea level or the operation may be conducted under a reduced pressure such as with water boiling below 212° F. It is contemplated that the present invention will include such operations in which the aluminum alcoholate is hydrolyzed by contacting with water vapor such that the aluminum alcoholate is hydrolyzed to the boehmite rather than the bayerite. The latter hydrate is unsuitable in the practice of the present invention.

It is contemplated in the practice of the present invention that a catalytic material such as platinum, palladium, rhodium, ruthenium, iridium and osmium, may be incorporated with the gamma alumina derived from the boehmite hydrate. The catalytic material of the type illustrated, which is preferably platinum, may be incorporated with either the gamma alumina or the boehmite. If the catalytic material is incorporated with the gamma alumina, it is intimately admixed therewith, and if water is present, the admixture is subjected to a heating operation in the range from 600° to 1600° F. to drive off water and to form a platinum on gamma alumina catalyst. If the catalytic material is added to the hydrate, boehmite, the catalytic material such as platinum is intimately admixed therewith, the admixture is dried to remove any moisture and alcohol and the admixture then subjected to a high temperature in the range of 600° to 1600° F. to convert the boehmite to gamma alumina and to form a platinum on gamma alumina catalyst.

In the process of the present invention in which the catalyst is used to convert hydrocarbons, temperatures for the conversion operation may suitably range from about 850° to 1000° F. while pressures will range from about 200 to about 750 p. s. i. g. Hydrogen or a hydrogen rich recycle gas may be used in the practice of the present invention and suitably may be used in an amount in the range from about 2000 to about 10,000 standard cubic feet per barrel of feed. The hydrocarbon may contact the catalyst at a space velocity from about 1 to 5 volumes of feed per volume of catalyst per hour.

The hydrocarbon employed as a feed stock in the process of the present invention may be a hydrocarbon boiling from about 100° to about 500° F. and suitably may be a paraffinic hydrocarbon, a naphthenic hydrocarbon or an olefinic hydrocarbon. It is preferred to use naphthenic hydrocarbons as a feed stock since the catalyst of the present invention converts the naphthenic hydrocarbons readily to aromatic hydrocarbons. Actually the feed stock may suitably be a mixture of paraffinic and naphthenic hydrocarbons which may be converted to the more desirable aromatic and olefinic hydrocarbons. Actually the paraffinic hydrocarbons may also be converted to desirable isohydrocarbons.

In practicing the present invention, the boehmite or gamma alumina formed by controlled hydrolysis of an aluminum alcoholate as described before may have added to it a compound or a solution of a compound of the various metals mentioned before. For example, when it is desired to produce a platinum on gamma alumina catalyst, a chloroplatinic acid solution such as an aqueous solution of the chloroplatinic acid may be intimately admixed with the gamma alumina and the admixture then subjected to a heating process such as to a temperature of 230° F. to remove the water and to form a platinum or platinum compound on gamma alumina catalyst. The so formed catalyst may then be pilled in a suitable pilling device to yield a composition which may be activated at a temperature of 600° to 1600° F. prior to use in fixed bed operations; this activation may be carried out either prior or subsequent to charging the composition to a unit.

If it is desired to use the catalyst in the fluidized powder type operation in which the catalyst is suspended in the vaporized hydrocarbon, it may be desirable to incorporate the platinum on the gamma alumina in a finely divided form so that the platinum on gamma alumina catalyst may be freely suspended in the vaporized hydrocarbon to allow intimate contact of the hydrocarbon with the catalyst. When a fluidized powder type operation is employed, the catalyst will have particle sizes in the range from about 0 microns to about 100 microns with the larger amount of the catalyst particles having diameters in the range from about 20 to about 30 microns.

The present invention will be further illustrated by reference to the drawing in which the single figure is a flow diagram of one mode of using the catalyst.

Referring now to the drawing, numeral 11 designates a charge tank in which a naphthenic hydrocarbon feed such as a naphtha from a Coastal crude oil boiling in the range from about 200° to 400° F. is obtained from a source not shown. The naphtha in said tank 11 is withdrawn therefrom by line 12 containing pump 13 and is discharged into a heater or furnace 14 and is passed through a coil 15 wherein the temperature of the naphtha is raised to a temperature of about 975° F. and discharged by line 16 into a reaction zone 17 in which a bed of catalyst 18 illustrated by platinum on gamma alumina is arranged on a grid plate 19. The feed stock passing downwardly through the catalyst bed 18 is converted to more desirable hydrocarbons.

Since the conversion of hydrocarbons in the present invention is favored by the use of hydrogen, provision is made to introduce hydrogen or hydrogen rich recycle gas into the feed stock flowing through line 16 into reaction zone 17. Line 20 controlled by valve 21 introduces hydrogen into the system. Since this reaction is endothermic, heat is consumed in the reaction, and the converted product issues from the reaction zone 17 through line 22 at a temperature substantially lower than the temperature at which the heated feed stock enters the zone 17. For example, the temperature of the converted product in line 22 may be about 850° F. It is, therefore, necessary to provide heat to raise the temperature of the converted product in the present operation in which a plurality of reaction zones is employed. Therefore, a heater or furnace 23 is provided and the product in line 22 is passed through a coil 24 in which the temperature of the product is raised to about 975° F. The reheated product is then discharged from the heater 23 by line 25 into a second reaction zone 26 which, like reaction zone 17, is provided with a bed of catalyst 27 arranged on a grid plate 28. The partially converted product from zone 17 passes downwardly through the bed 27 and is further converted. The converted product issues from reaction zone 26 through line 29 and is passed through a third heater or furnace 30 containing a coil 31. Since the reaction in zone 27 is also endothermic and heat is consumed, the products in line 29 are at a temperature of about 900° F. Passed through coil 31 raises the temperature back up to about 975° F., and the converted products pass by line 32 into a third reaction zone 33 in which is arranged a bed of catalyst 34 on a grid plate 35. The converted products from reaction zones 17 and 26 pass downwardly through reaction zone 33 and through the bed of catalyst 34 to cause further conversion of the products. The converted products issue from reaction zone 33 by line 36 at a temperature of about 940° F. The temperature of the converted product is then reduced rapidly by passage through a cooler or condenser 37 containing a coil 38. A cooling fluid such as water and the like is circulated through cooler 37 by lines 39 and 40. The cooled and condensed products are then discharged by line 41 at a temperature sufficient for distillation into a distillation tower 42 which, like the well-known distillation tower on the market is provided with auxiliary equipment to allow precision fractionation of the converted products. For example, distillation zone 42 is equipped with internal baffling equipment such as bubble cap trays, plates or other similar vapor-liquid-containing means. The distillation tower 42 is also provided with a heating means illustrated by steam coil 43 for adjustment of temperature and pressure. Tower 42 is provided with a line 44 for withdrawal of fixed gases and with lines 45, 46 and 47 controlled respectively by valves 48, 49 and 50 for withdrawal of suitable side streams and for segregation of desired products. A heavier bottoms fraction may be withdrawn from tower 42 by line 51. Zone 42 may suitably include flash vaporization equipment as desired. Furthermore, it is contemplated that the off gases from zone 42 may be used as the source of hydrogen as a recycle stream in lieu of fresh hydrogen. It is to be understood that in reaction zones 17, 26 and 33 the same catalyst is employed.

When employing the method of the present invention, such as with a platinum on gamma catalyst wherein the gamma alumina is derived from boehmite, it is unnecessary to regenerate the catalyst frequently. In short, the catalyst of the present invention will involve regeneration only at long intervals. After use, the regeneration time will amount to from about 1 to about 10% of the operating time and ordinarily will amount to about 5% of the time of reaction. When such regeneration is required, this may be accomplished simply by passing an oxygen-containing gas over the catalyst to cause oxidation or burning of any carbonaceous deposits on the catalyst. It may be desirable to follow the regeneration treatment by a treatment with a hydrogen-containing gas to place the catalyst back into its original condition. Regeneration treatment ordinarily will be accomplished at a temperature of about 800° to about 1200° F.

The invention will be further illustrated by the preparation of a 0.5% by weight platinum on gamma alumina catalyst. A suitable quantity of boehmite prepared from aluminum amylate, as described after drying at 230° F., was converted to gamma alumina by heating in air at 1000° F. for about 6 hours. To about 1600 grams of this gamma alumina there was added 190 ml. of aqueous chloroplatinic acid solution containing 21.1 grams of $H_2PtCl_6 \cdot 6H_2O$ and 2250 ml. of distilled water. This mixture was then mulled in a jar mill for 3 hours, after which 500 ml. of water were added and mulling continued for about 2 hours. 300 ml. of water was added to the admixture and mulling continued for 1 additional hour. Thereafter 600 mls. of water were added and mulling continued for 6 hours further. 300 mls. of water were added, and the mulling continued for a period of 10 hours. 700 additional mls. of water were added, and mulling was then terminated after 7 hours. Water was added batchwise in order to provide the optimum amount of water for effective mulling without exceeding this amount. The mulled mixture was then dried at 230° F. for 24 hours and then formed into ¾₁₆" pills to yield a catalyst which only requires activation prior to use.

This catalyst, after appropriate hydrogen pretreatment at reaction temperatures, was then contacted with a hydrocarbon feed and was found to convert the hydrocarbons into desirable products.

While the present invention has been illustrated by the employment chloroplatinic acid, it is within the spirit and scope of the invention to employ platinum and other catalytic metals such as illustrated before or compounds of such metals. For example, the soluble halides and the oxides, hydroxides and sulfides which may be prepared in a finely-divided state (preferably colloidal) prior to addition to the support may be suitably used as the source of the metal employed in the present invention.

The nature and objects of the present invention having been completely described and illustrated, what we wish to claim as new and useful and to secure by Letters Patent is:

1. A method of preparing a catalyst suitable for use in hydrocarbon conversion operations which comprise admixing a solution of a platinum-containing compound with gamma alumina derived from alumina alpha monohydrate, said alumina alpha monohydrate being obtained by reacting aluminum with an aliphatic alcohol to form an alcoholate and contacting said alcoholate with water vapor under conditions to hydrolyze said alcoholate to alumina alpha monohydrate and heating the admixture to a temperature in the range from 600° to 1600° F. sufficient to dry same and to form a platinum on alumina catalyst.

2. A method of preparing a catalyst suitable for use in hydrocarbon conversion operations which comprises admixing an aqueous solution of chloroplatinic acid with gamma alumina derived from alumina alpha monohydrate, said alumina alpha monohydrate being obtained by reacting aluminum with an aliphatic alcohol to form an alcoholate and contacting said alcoholate with water vapor under conditions to hydrolyze said alcoholate to alumnia alpha monohydrate, heating the admixture to a temperature of approximately 230° F. to dry same, forming the dried mixture into pills, and then heating the pills to a temperature in the range from 600° to 1600° F.

3. A method of preparing a catalyst suitable for use in hydrocarbon conversion operations which comprises admixing a solution of a platinum-containing compound with alumina alpha monohydrate, said alumina alpha monohydrate being obtained by reacting aluminum with an aliphatic alcohol to form an alcoholate and contacting said alcoholate with water vapor under conditions to hydrolyze said alcoholate to alumina alpha monohydrate, drying the admixture, and then heating the dried admixture to a temperature in the range from 600° to 1600° F. to obtain a platinum on alumina catalyst.

4. A method of preparing a platinum on lumina catalyst suitable for use in hydrocarbon conversion operations which comprises mulling an aqueous solution of chloroplatinic acid with gamma alumina derived from alumina alpha monohydrate, said alumina alpha monohydrate being obtained by reacting aluminum with an aliphatic alcohol to form an alcoholate and contacting said alcoholate with water vapor under conditions to hydrolyze said alcoholate to alumina alpha monohydrate, while adding water over a period of time sufficient to form an intimate admixture of said acid and said gamma alumina, heating the mixture to a temperature of approximately 230° F. to dry same and to form a platinum on gamma alumina catalyst, forming said platinum on alumina catalyst into pills, and then heating said pills to a temperature in the range from 600° to 1600° F.

References Cited in the file of this patent

UNITED STATES PATENTS

| | | |
|---|---|---|
| 2,327,593 | De Simo et al. | Aug. 24, 1943 |
| 2,479,110 | Haensel | Aug. 16, 1949 |
| 2,636,865 | Kimberlin | Apr. 28, 1953 |
| 2,636,909 | Oblad et al. | Apr. 28, 1953 |
| 2,749,216 | Dinwiddie et al. | June 5, 1956 |

OTHER REFERENCES

"Thermal Transformation of Aluminas and Aluminum Hydrates," Stumpf et al., Ind. and Eng. Chem., vol. 42 (July 1950), pages 1398–1403.